United States Patent
Papageorgiou

(10) Patent No.: US 8,184,034 B2
(45) Date of Patent: May 22, 2012

(54) CODE SEQUENCE GENERATOR

(75) Inventor: Andrew Papageorgiou, Lower Cambourne (GB)

(73) Assignee: Cambridge Silicon Radio Limited, London (GB)

( * ) Notice: Subject to any disclaimer, the term of this patent is extended or adjusted under 35 U.S.C. 154(b) by 960 days.

(21) Appl. No.: 12/176,462

(22) Filed: Jul. 21, 2008

(65) Prior Publication Data

US 2010/0013694 A1    Jan. 21, 2010

(51) Int. Cl.
*H04L 17/02* (2006.01)
*G11C 19/00* (2006.01)
(52) U.S. Cl. .......................... 341/173; 377/72
(58) Field of Classification Search .................. 341/173; 377/72
See application file for complete search history.

(56) References Cited

U.S. PATENT DOCUMENTS

| | | | | |
|---|---|---|---|---|
| 5,090,035 A | * | 2/1992 | Murase | 377/72 |
| 5,784,427 A | * | 7/1998 | Bennett et al. | 377/72 |
| 5,984,521 A | * | 11/1999 | Bang | 714/701 |
| 6,442,579 B1 | * | 8/2002 | Hansson | 708/252 |
| 6,691,142 B2 | * | 2/2004 | Howlett | 708/252 |
| 6,763,363 B1 | * | 7/2004 | Driscoll | 708/252 |
| 7,082,448 B2 | * | 7/2006 | Cho | 708/250 |

* cited by examiner

*Primary Examiner* — Jared Fureman
*Assistant Examiner* — Scott Bauer
(74) *Attorney, Agent, or Firm* — Blank Rome LLP

(57) ABSTRACT

A code sequence generator (20) comprising a memory (22), a feedback logic network (24) and an output logic network (26) which is configured to perform a logic function on the contents of elements (26) of the memory (22) to generate bits of the code sequence, wherein the code sequence generator (20) outputs a plurality of bits of the code simultaneously.

16 Claims, 3 Drawing Sheets

Figure 1 (--Prior Art--)

CODE SEQUENCE GENERATOR

BACKGROUND OF THE INVENTION

1. Field of the Invention

The present invention relates to a code sequence generator and to a method of generating a code sequence.

2. Description of Related Art

In third generation (3G) and other telecommunications systems, it is commonplace for a transmitted signal to be "spread" across a wide frequency range to improve the signal to noise plus interference ratio of the transmitted signal. As part of this spreading process, a pseudo-random bit sequence known as a scrambling code may be applied to the signal to be transmitted. One approach to generating the scrambling code to be applied to the signal to be transmitted is to use a linear feedback shift register (LFSR). An LFSR is shown generally at 10 in FIG. 1, and comprises a shift register 12 which is pre-loaded with an initial bit sequence (known as a seed), a feedback logic network 14 and an output logic network 16.

The feedback logic network 14 is typically a network of one or more exclusive-or logic gates whose inputs are connected to particular elements of the shift register 12. The feedback logic network 14 generates a new input bit, which is input to the shift register 12 at the most significant bit (MSB) position. The output logic network 16 is typically a network of exclusive-or gates whose inputs are connected to particular elements of the shift register 12.

The LFSR 10 is clocked, such that each clock cycle the contents of the shift register 12 are shifted to the right by one position. The feedback logic network 14 causes a new bit value to be input to the MSB position of the shift register 12 each clock cycle, and this changes the contents of the shift register 12. The output logic network 16 generates an output bit each clock cycle, which output bit is dependent upon the contents of the elements of the shift register 12 to which the inputs of the output logic network cycle are connected. In this way, a pseudo-random bit sequence is output by the LFSR 10 over the course of a number of clock cycles.

A disadvantage of the LFSR illustrated in FIG. 1 is that only one bit of the output bit sequence (i.e. the code generated) is produced each clock cycle, and thus it may take a considerable amount of time to generate a scrambling code, which in turn delays "downstream" operations.

BRIEF SUMMARY OF THE INVENTION

According to a first aspect of the present invention, there is provided a code sequence generator comprising a memory, a feedback logic network and an output logic network which is configured to perform a logic function on the contents of elements of the memory to generate bits of the code sequence, wherein the code sequence generator outputs a plurality of bits of the code sequence simultaneously.

Outputting a plurality of bits of the code sequence simultaneously enables parallel processing of the code sequence by components of a system which uses the code sequence, thus improving the performance of such a system.

The feedback logic network may be configured to perform a logic function on the contents of elements of the memory to generate new input bits to the memory.

The output logic network may implement a plurality of output bit masks which define how the output bits of the code generator are generated.

A first of the plurality of the output bit masks may predefined and the remainder of the plurality of the output bit masks may be derived from the first of the plurality of the output bit masks.

The feedback logic network may implement a plurality of bit masks which define how the new input bits are generated.

A first of the plurality of feedback bit masks may be predefined and the remainder of the plurality of feedback bit masks may be derived from the first of the plurality of the feedback bit masks.

Where a most significant bit of an nth output bit mask of the plurality of the output bit masks is set to logic 1, the (n+1)th output bit mask may derived from the nth output bit mask and a feedback bit mask.

Where a most significant bit of an nth feedback bit mask of the plurality of feedback bit masks is set to logic 1, an (n+1)th feedback bit mask may be derived from the nth feedback bit mask and another of the plurality of feedback bit masks.

According to a second aspect of the invention, there is provided a method of generating a code sequence, the method comprising populating a memory with a sequence of bits, performing a feedback logic operation on bits of the sequence in the memory unit, performing an output logic operation on bits of the sequence in the memory and simultaneously outputting a plurality of bits of the code sequence so generated.

Performing a feedback logic operation may comprise performing a logic function on the contents of elements of the memory to generate new input bits to the memory.

Performing an output logic operation may comprise implementing a plurality of output bit masks which define how the plurality of bits of the code sequence outputted are generated.

A first of the plurality of the output bit masks may be predefined and the remainder of the plurality of the output bit masks may be derived from the first of the plurality of the output bit masks.

Performing a feedback logic operation may comprise implementing a plurality of bit masks which define how the new input bits are generated.

A first of the plurality of feedback bit masks may be predefined and the remainder of the plurality of feedback bit masks may be derived from the first of the plurality of the feedback bit masks.

Where a most significant bit of an nth output bit mask of the plurality of the output bit masks is set to logic 1, the (n+1)th output bit mask may be derived from the nth output bit mask and a feedback bit mask.

Where a most significant bit of an nth feedback bit mask of the plurality of feedback bit masks is set to logic 1, an (n+1)th feedback bit mask may be derived from the nth feedback bit mask and another of the plurality of feedback bit masks.

According to a third aspect of the invention, there is provided a computer program for performing the method of the second aspect.

BRIEF DESCRIPTION OF THE DRAWINGS

Embodiments of the invention will now be described, strictly by way of example only, with reference to the accompanying drawings, of which

DETAILED DESCRIPTION OF THE INVENTION

Figure 1:
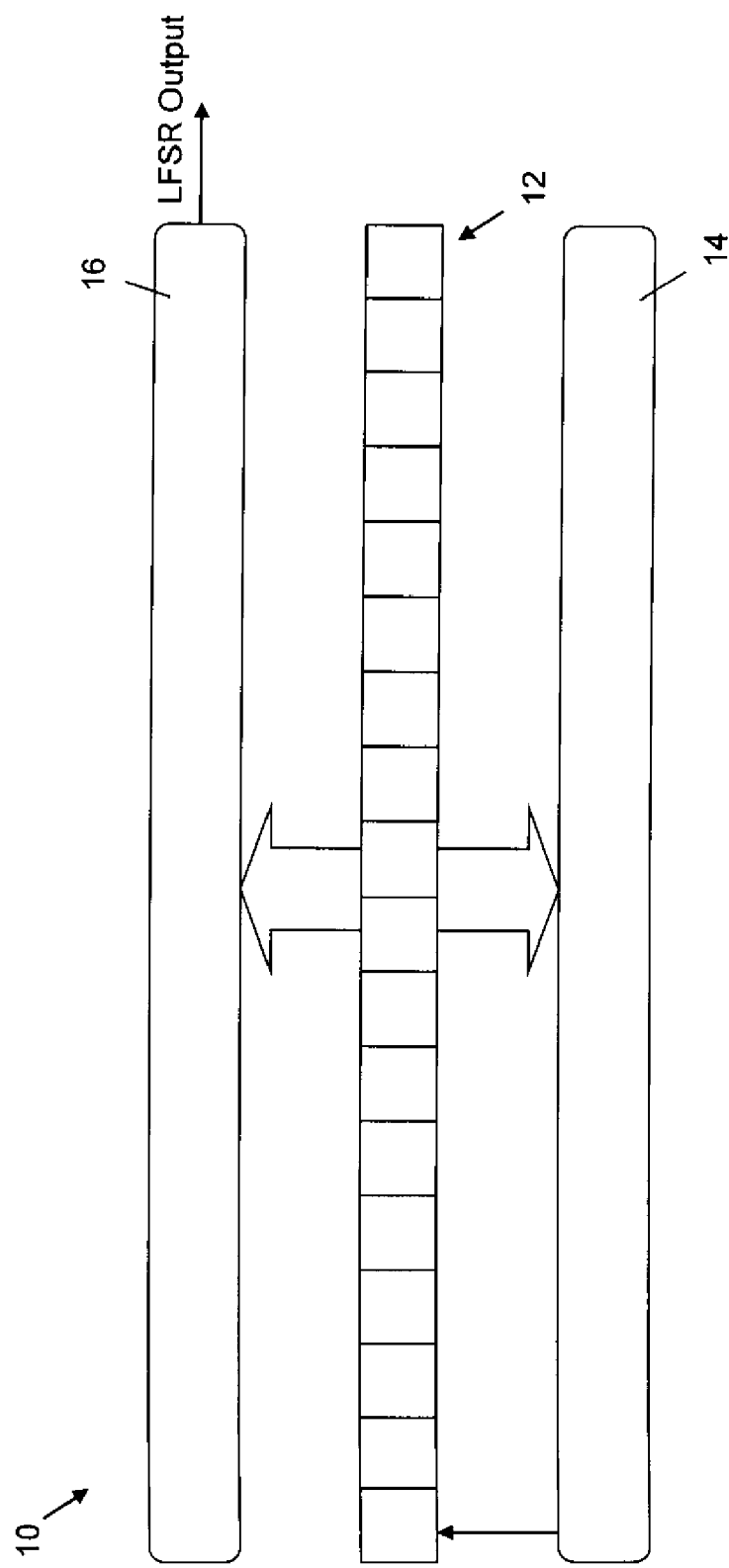
FIG. 1 is a schematic illustration of a known linear feedback shift register.
Figure 2:
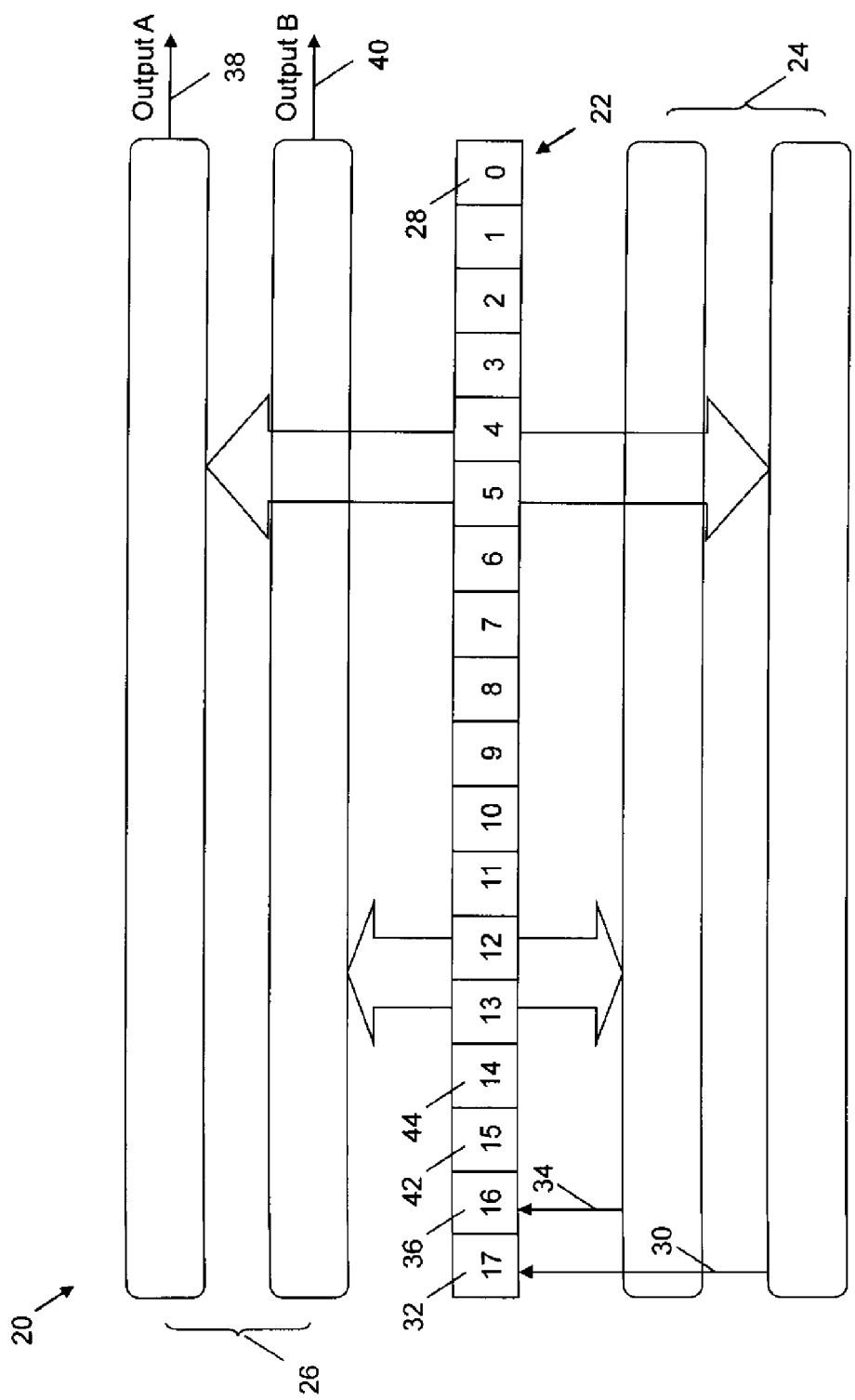
FIG. 2 is a schematic illustration of a code generator according to the present invention which is capable of outputting two bits simultaneously.

Referring first to FIG. 2, a code generator is shown generally at 20. The code generator 20 comprises a memory unit, in this example a shift register 22, having eighteen elements 28 (numbered 0 to 17 in the Figure to indicate the bit position in the shift register 22 of each element), each of which is capable of storing a single bit. Thus, the code generator 20 produces a code sequence comprising eighteen bits. The shift register 22 is pre-loaded with an eighteen-bit seed, which forms a starting value from which a code sequence may be generated. The code generator 20 is synchronised to a clock signal (not shown) which controls the timing of actions carried out by the code generator 20.

A feedback logic network 24 is connected to the shift register 22 to implement feedback bit masks which determine how new input bits to the shift register 22 are generated. The feedback logic network 24 comprises one or more logic gates such as exclusive-or gates, whose inputs are connected, directly or indirectly, to elements 28 of the shift register 22, with a first output 30 of the feedback logic network 24 being connected to a first element 32 (i.e. bit 17) of the shift register 22 and a second output 34 of the feedback logic network 24 being connected to a second element 36 (bit 16) of the shift register 22. The outputs 30, 34 of the feedback logic network are dependent upon the contents of the elements 28 of the shift register 22 to which the inputs of the logic gates of the feedback logic network 24 are connected.

An output logic network 26 is connected to the shift register 22 to implement output bit masks which determine how output bits from the code generator 20 are generated. The output logic network 26 comprises one or more logic gates such as exclusive-or gates, whose inputs are connected, directly or indirectly, to elements 28 of the shift register 22. The output logic network 26 of this example has two outputs 38, 40, and thus the code generator 20 is able to output two bits of a generated code sequence simultaneously.

Every clock cycle the contents of the shift register 22 are shifted to the right by two bit positions. For example, the bits contained in elements 32 and 36 are shifted to elements 42 and 44 respectively. Elements 32 and 36 are filled with new input bits generated by the feedback logic network 24, and these new input bits are based on the contents of the shift register 22 in the previous clock cycle. As the contents of the shift register 22 change every clock cycle, two new output bits are generated by the output logic network 26 every clock cycle, and these output bits are dependent upon the contents of the elements 28 of the shift register 22 to which the inputs of the logic gates of the output logic network 26 are connected. Thus, the code generator 20 illustrated in FIG. 2 produces two bits of a code sequence simultaneously every clock cycle, which permits faster processing of the generated code sequence by downstream components of a system such as a transmitter or receiver in which the code generator is used.

Figure 3:
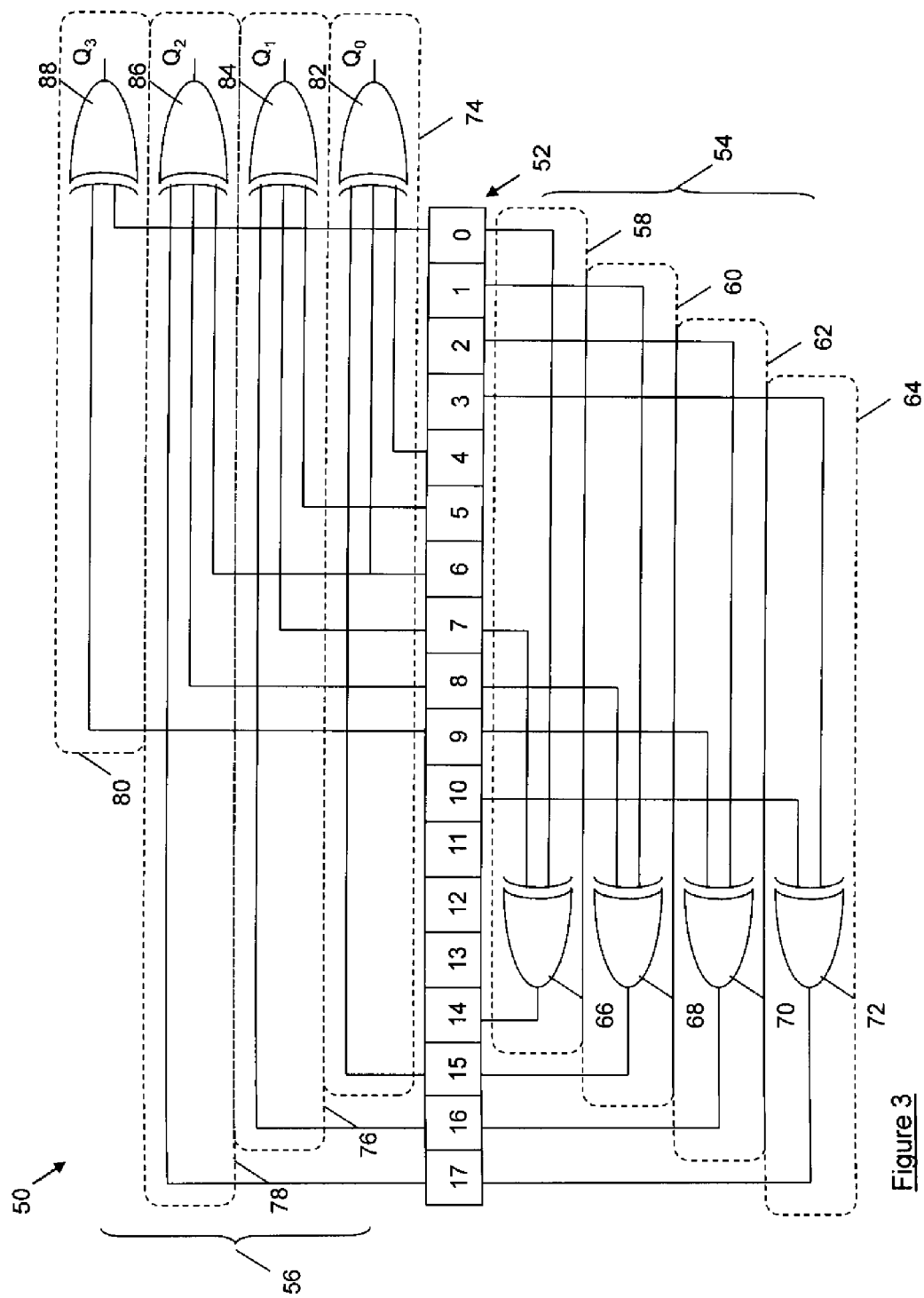
FIG. 3 is a schematic illustration showing exemplary feedback and output logic networks for a code generator according to the present invention which is capable of outputting four bits simultaneously.

FIG. 3 illustrates an example of a code generator which is able to output four bits of a generated code sequence simultaneously. The code generator, illustrated generally at 50, comprises an eighteen bit memory unit in the form of a shift register 52 (whose elements are labelled 0 to 17 in the Figure to indicate the bit positions in the shift register 52 of the elements) to which are connected a feedback logic network 54 and an output logic network 56. The code generator 50 is synchronised to a clock signal (not shown). The shift register 52 is pre-loaded with an 18 bit seed from which code sequences may be generated.

The feedback logic network 56 implements four feedback bit masks 58, 60, 62, 64 which determine how new inputs to the shift register 52 are generated. The feedback bit masks are defined in the table below, which lists the shift register bit positions used by the feedback bit masks 58, 60, 62, 64.

|    | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|---|---|---|---|---|---|---|---|---|---|
| 58 | 0  | 0  | 0  | 0  | 0  | 0  | 0  | 0  | 0 | 0 | 1 | 0 | 0 | 0 | 0 | 0 | 0 | 1 |
| 60 | 0  | 0  | 0  | 0  | 0  | 0  | 0  | 0  | 0 | 1 | 0 | 0 | 0 | 0 | 0 | 0 | 1 | 0 |
| 62 | 0  | 0  | 0  | 0  | 0  | 0  | 0  | 0  | 1 | 0 | 0 | 0 | 0 | 0 | 0 | 1 | 0 | 0 |
| 64 | 0  | 0  | 0  | 0  | 0  | 0  | 0  | 1  | 0 | 0 | 0 | 0 | 0 | 0 | 1 | 0 | 0 | 0 |

Thus, to implement feedback bit mask 58, the elements of the shift register 52 at bit positions 0 and 7 are connected to the inputs of an exclusive-or gate 66, whose output is connected to the fourth element of the shift register 52, which corresponds to bit position 14.

Similarly, to implement feedback bit mask 60, the elements of the shift register 52 corresponding to bit positions 1 and 8 are connected to the inputs of an exclusive-or gate 68, whose output is connected to the third element of the shift register 52, which corresponds to bit position 15.

Feedback bit mask 62 is implemented by connecting the inputs of an exclusive-or gate 70 to the elements of the shift register 52 corresponding to bit positions 2 and 9, with the output of the exclusive-or gate 70 being connected to the second element of the shift register 52, which corresponds to bit position 16, whilst feedback bit mask 64 is implemented by connecting the inputs of an exclusive-or gate 72 to the elements of the shift register 52 corresponding to bit positions 3 and 10, with the output of the exclusive-or gate 72 being connected to the first element of the shift register, which corresponds to bit position 17.

The output logic network 56 implements four output bit masks 74, 76, 78, 80 which determine how outputs Q0, Q1, Q2 and Q3 of the code generator 50 are generated. The output bit masks are defined in the table below, which lists the shift register bit positions used by the output bit masks 74, 76, 78, 80.

|    | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|---|---|---|---|---|---|---|---|---|---|
| 74 | 0  | 0  | 1  | 0  | 0  | 0  | 0  | 0  | 0 | 0 | 0 | 1 | 0 | 1 | 0 | 0 | 0 | 0 |
| 76 | 0  | 1  | 0  | 0  | 0  | 0  | 0  | 0  | 0 | 0 | 1 | 0 | 1 | 0 | 0 | 0 | 0 | 0 |
| 78 | 1  | 0  | 0  | 0  | 0  | 0  | 0  | 0  | 0 | 1 | 0 | 1 | 0 | 0 | 0 | 0 | 0 | 0 |
| 80 | 0  | 0  | 0  | 0  | 0  | 0  | 0  | 0  | 1 | 0 | 0 | 0 | 0 | 0 | 0 | 0 | 0 | 1 |

Thus, to implement output bit mask 74, the elements of the shift register 52 at bit positions 4, 6 and 15 are connected to the inputs of an exclusive-or gate 82, whose output forms output bit Q0 of the code generator 50.

Similarly, the output bit mask 76, which determines how the output bit Q1 of the code generator 50 is generated, is implemented using a single exclusive-or gate 84 whose inputs are connected to the elements of the shift register 52 at bit positions 5, 7 and 16.

To implement output bit mask 78, the elements of the shift register 52 at bit positions 6, 8 and 17 are connected to the inputs of an exclusive-or gate 86, whose output is used as the output Q2 of the code generator 50.

Output bit mask 80 is implemented using a single two-input exclusive-or gate 88 whose inputs are connected to the elements of the shift register 52 corresponding to bit positions 0 and 9. The output of the exclusive-or gate 88 is used as output Q3 of the code generator.

Every clock cycle, the contents of the shift register 52 are shifted to the right by four bit positions. The contents of the shift register elements at bit positions 17, 16, 15 and 14 are replaced by bits generated by the feedback logic network 54 in accordance with the feedback bit masks 58, 60, 62, 64. The inputs to the output logic network 56 change as the contents of the elements of the shift register 52 change, and thus the output bits Q0 to Q3 change in accordance with the output bit masks 74, 76, 78, 80. In this way the code generator 50 is able to output four bits of the code sequence simultaneously in a single clock cycle, which permits faster processing of the code generated by downstream components of a system such as a transmitter or receiver in which the code generator is used.

The feedback bit masks 58, 60, 62, 64 and the output bit masks 74, 76, 78, 80 are defined according to the type of code sequence to be generated by the code generator 50. It will be noted that in this example the feedback bit mask 60 is a copy of the feedback bit mask 58 which has been shifted to the left by one bit position. Similarly, the feedback bit mask 64 is a copy of the feedback bit mask 62 which has been shifted to the left by one position.

As a general rule, the feedback bit mask Fn+i which defines the input to a shift register element at bit position n+i can be derived from a feedback bit mask defining the input to shift register element at a position n, to the right of the position n+i, as follows:

$$F_{n+i} = F_n << i,$$

where << indicates a bitwise shift to the left.

The output bit masks 78, 76 are similarly bit-shifted versions of the output bit mask 74, and the general rules described above in relation to the feedback bit masks apply to the output bit masks. Thus, $$O_{n+i} = O_n << i,$$

where $O_n$ is the output bit mask which defines an nth output of the output logic network.

However, in the case where the most significant bit (MSB) of an output bit mask is set to 1, as is the case for output bit mask 78, the next output bit mask is calculated by performing a bitwise shift to the left of the current output bit mask and performing a bitwise exclusive-or operation on the shifted bit mask with the first feedback bit mask 58.

Output bit mask 78 is as follows

|    | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|---|---|---|---|---|---|---|---|---|---|
| 78 | 1  | 0  | 0  | 0  | 0  | 0  | 0  | 0  | 0 | 1 | 0 | 1 | 0 | 0 | 0 | 0 | 0 | 0 |

To calculate output bit mask 80 it is necessary first to shift output bit mask 78 to the left by one bit position, giving

| 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|---|---|---|---|---|---|---|---|---|---|
| 0  | 0  | 0  | 0  | 0  | 0  | 0  | 0  | 1 | 0 | 1 | 0 | 0 | 0 | 0 | 0 | 0 | 0 |

The result of this shifting operation is then subjected to an exclusive-or operation with the first feedback bit mask 58, to give the fourth output bit mask 80.

|    | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|---|---|---|---|---|---|---|---|---|---|
| 80 | 0  | 0  | 0  | 0  | 0  | 0  | 0  | 0  | 1 | 0 | 0 | 0 | 0 | 0 | 0 | 0 | 0 | 1 |

To generalise, if $MSB(O_n)=1$, $O_{n+1}=(O_n<<1) \oplus F_0$, where $F_0$ is the first feedback bit mask.

In the case where it is desired to generate a feedback bit mask from the current feedback bit mask, in which the most significant bit is set to logic 1, the same process is followed, i.e. the current feedback bit mask is shifted to the left by one bit position and the result is subjected to an exclusive-or operation with the first feedback bit mask. Thus in general, if $MSB(F_n)=1$, $F_{n+1}=(F_n<<1) \oplus F_0$ In the examples presented above, exclusive-or gates are used in the feedback and output logic networks. However, it will be appreciated that other logic gates or combinations of logic gates may also be used, depending upon the type of code sequence required.

The exemplary code generators 20, 50 described above are implemented using standard hardware elements. However, it will be appreciated that the code generators could equally be implemented in software running on an appropriately configured processing system.

Although a few preferred embodiments of the present invention have been described, it will be understood by those skilled in the art that the present invention should not be limited to the described preferred embodiments, but various changes and modifications can be made within the spirit and scope of the present invention as defined by the appended claims.

I claim:

1. A code sequence generator comprising a memory, a feedback logic network and an output logic network which is configured to perform a logic function on the contents of elements of the memory to generate bits of the code sequence, the code sequence generator being configured to output a plurality of bits of the code sequence simultaneously, wherein the output logic network implements a plurality of output bit masks which define how the output bits of the code generator are generated, and wherein a most significant bit of an nth output bit mask of the plurality of the output bit masks is set to logic 1 and the (n+1)th output bit mask is derived from the nth output bit mask and a feedback bit mask.

2. A code sequence generator according to claim 1 wherein the feedback logic network is configured to perform a logic function on the contents of elements of the memory to generate new input bits to the memory unit.

3. A code sequence generator according to claim 1 wherein a first of the plurality of the output bit masks is predefined and the remainder of the plurality of the output bit masks are derived from the first of the plurality of the output bit masks.

4. A code sequence generator according to claim 2 wherein the feedback logic network implements a plurality of bit masks which define how the new input bits are generated.

5. A code sequence generator according to claim 4 wherein a first of the plurality of feedback bit masks is predefined and the remainder of the plurality of feedback bit masks are derived from the first of the plurality of the feedback bit masks.

6. A code sequence generator according to claim 4 wherein a most significant bit of an nth feedback bit mask of the plurality of feedback bit masks is set to logic 1 and an (n+1)th feedback bit mask is derived from the nth feedback bit mask and another of the plurality of feedback bit masks.

7. A method of generating a code sequence, the method comprising populating a memory with a sequence of bits, performing a feedback logic operation on bits of the sequence in the memory, performing an output logic operation on bits of the sequence in the memory and simultaneously outputting a plurality of bits of the code sequence so generated, wherein performing an output logic operation comprises implementing a plurality of output bit masks which define how the plurality of bits of the code sequence outputted are generated, and wherein a most significant bit of an nth output bit mask of the plurality of the output bit masks is set to logic 1 and the (n+1)th output bit mask is derived from the nth output bit mask and a feedback bit mask.

8. A method according to claim 7 wherein performing a feedback logic operation comprises performing a logic function on the contents of elements of the memory to generate new input bits to the memory.

9. A method according to claim 7 wherein a first of the plurality of the output bit masks is predefined and the remainder of the plurality of the output bit masks are derived from the first of the plurality of the output bit masks.

10. A method according to claim 8 wherein performing a feedback logic operation comprises implementing a plurality of bit masks which define how the new input bits are generated.

11. A method according to claim 10 wherein a first of the plurality of feedback bit masks is predefined and the remainder of the plurality of feedback bit masks are derived from the first of the plurality of the feedback bit masks.

12. A method according to claim 10 wherein a most significant bit of an nth feedback bit mask of the plurality of feedback bit masks is set to logic 1 and an (n+1)th feedback bit mask is derived from the nth feedback bit mask and another of the plurality of feedback bit masks.

13. A non-transitory computer-readable medium containing non-transitory instructions for generating a code sequence according to a method comprising:
 populating a memory with a sequence of bits;
 performing a feedback logic operation on bits of the sequence in the memory;
 performing an output logic operation on bits of the sequence in the memory; and
 simultaneously outputting a plurality of bits of the code sequence so generated,
 wherein performing an output logic operation comprises implementing a plurality of output bit masks which define how the plurality of bits of the code sequence outputted are generated, and wherein a most significant bit of an nth output bit mask of the plurality of the output bit masks is set to logic 1 and the (n+1)th output bit mask is derived from the nth output bit mask and a feedback bit mask.

14. A code sequence generator comprising a memory, a feedback logic network and an output logic network which is configured to perform a logic function on the contents of elements of the memory to generate bits of the code sequence, the code sequence generator being configured to output a plurality of bits of the code sequence simultaneously, wherein the feedback logic network implements a plurality of bit masks which define how the new input bits are generated, and wherein a most significant bit of an nth feedback bit mask of the plurality of feedback bit masks is set to logic 1 and an (n+1)th feedback bit mask is derived from the nth feedback bit mask and another of the plurality of feedback bit masks.

15. A method of generating a code sequence, the method comprising populating a memory with a sequence of bits, performing a feedback logic operation on bits of the sequence in the memory, performing an output logic operation on bits of the sequence in the memory and simultaneously outputting a plurality of bits of the code sequence so generated, wherein performing a feedback logic operation comprises implementing a plurality of bit masks which define how the new input bits are generated, and wherein a most significant bit of an nth feedback bit mask of the plurality of feedback bit masks is set to logic 1 and an (n+1)th feedback bit mask is derived from the nth feedback bit mask and another of the plurality of feedback bit masks.

16. A non-transitory computer-readable medium containing non-transitory instructions for generating a code sequence according to a method comprising:

populating a memory with a sequence of bits;
performing a feedback logic operation on bits of the sequence in the memory;
performing an output logic operation on bits of the sequence in the memory; and
simultaneously outputting a plurality of bits of the code sequence so generated, wherein performing a feedback logic operation comprises implementing a plurality of bit masks which define how the new input bits are generated, and wherein a most significant bit of an nth feedback bit mask of the plurality of feedback bit masks is set to logic 1 and an (n+1)th feedback bit mask is derived from the nth feedback bit mask and another of the plurality of feedback bit masks.

* * * * *